(12) United States Patent
Wang

(10) Patent No.: US 7,717,386 B2
(45) Date of Patent: May 18, 2010

(54) SUPPORT ARM WITH CLAMPS FOR ADJUSTABLY FASTENING A VISUAL DISPLAY

(76) Inventor: Nai-Hsuan Wang, 6, Lane 422, Gaomei Road, Cingshuei, Taichung (TW)

( * ) Notice: Subject to any disclaimer, the term of this patent is extended or adjusted under 35 U.S.C. 154(b) by 207 days.

(21) Appl. No.: 12/129,698

(22) Filed: May 30, 2008

(65) Prior Publication Data

US 2009/0296326 A1    Dec. 3, 2009

(51) Int. Cl.
*A47G 1/10*    (2006.01)
(52) U.S. Cl. .................... 248/316.1; 248/500; 248/510; 248/316.8; 248/917; 269/134
(58) Field of Classification Search ............. 248/316.1, 248/316.5, 316.8, 500, 510, 917, 451; 269/134, 269/135, 137, 164
See application file for complete search history.

(56) References Cited

U.S. PATENT DOCUMENTS

| | | | |
|---|---|---|---|
| 685,078 A * | 10/1901 | Willringhaus | 269/120 |
| 2,913,965 A * | 11/1959 | Collis | 269/93 |
| 3,408,032 A * | 10/1968 | Francis | 248/450 |
| 4,332,203 A * | 6/1982 | Flowers | 105/422 |
| 6,491,268 B1 * | 12/2002 | Channer et al. | 248/176.1 |
| 2005/0189465 A1 * | 9/2005 | Matsuoka | 248/451 |
| 2008/0142668 A1 * | 6/2008 | Rickards | 248/451 |

* cited by examiner

*Primary Examiner*—J. Allen Shriver, II
*Assistant Examiner*—Bradley H Duckworth

(57) ABSTRACT

A support device includes a support arm and a support plate in which the support arm has two opposite clamps each having an arrangement for laterally moving a height adjustment mechanism so that after performing both vertical and horizontal adjustments of the clamps pressing pivotably connected arm members will secure a visual display (e.g., computer LCD display) onto the support plate.

2 Claims, 6 Drawing Sheets

SUPPORT ARM WITH CLAMPS FOR ADJUSTABLY FASTENING A VISUAL DISPLAY

BACKGROUND OF THE INVENTION

1. Field of Invention

The invention relates to computer display holding devices and more particularly to a support device comprising a support arm and a support plate in which the support arm has two opposite clamps each having an arrangement for laterally moving a height adjustment mechanism so that after performing both vertical and horizontal adjustments of the clamps pressing pivotal arm members will secure a visual display (e.g., LCD (liquid crystal display) display) onto the support plate.

2. Description of Related Art

Conventionally, a holder is provided for supporting a computer display (e.g., LCD display) on the desk. However, most conventional LCD display holders are not structural strong and are not reliable. Thus, an LCD display being clamped by the conventional LCD display holder is subject to fall if sufficient care is not taken.

There have been numerous suggestions in prior patents for computer display holding devices. For example, U.S. Pat. No. 6,554,238 discloses a support arm for visual display unit.

Hence, a need remains for an improved computer display holding device in order to contribute significantly to the advancement of the art.

SUMMARY OF THE INVENTION

It is therefore one object of the invention to provide a support device comprising a support arm and a support plate in which the support arm has two opposite clamps each having an arrangement for laterally moving a height adjustment mechanism so that after performing both vertical and horizontal adjustments of the clamps pressing pivotal arm members will secure a visual display (e.g., LCD display) onto the support plate.

The above and other objects, features and advantages of the invention will become apparent from the following detailed description taken with the accompanying drawings.

DETAILED DESCRIPTION OF THE INVENTION

Figure 1:
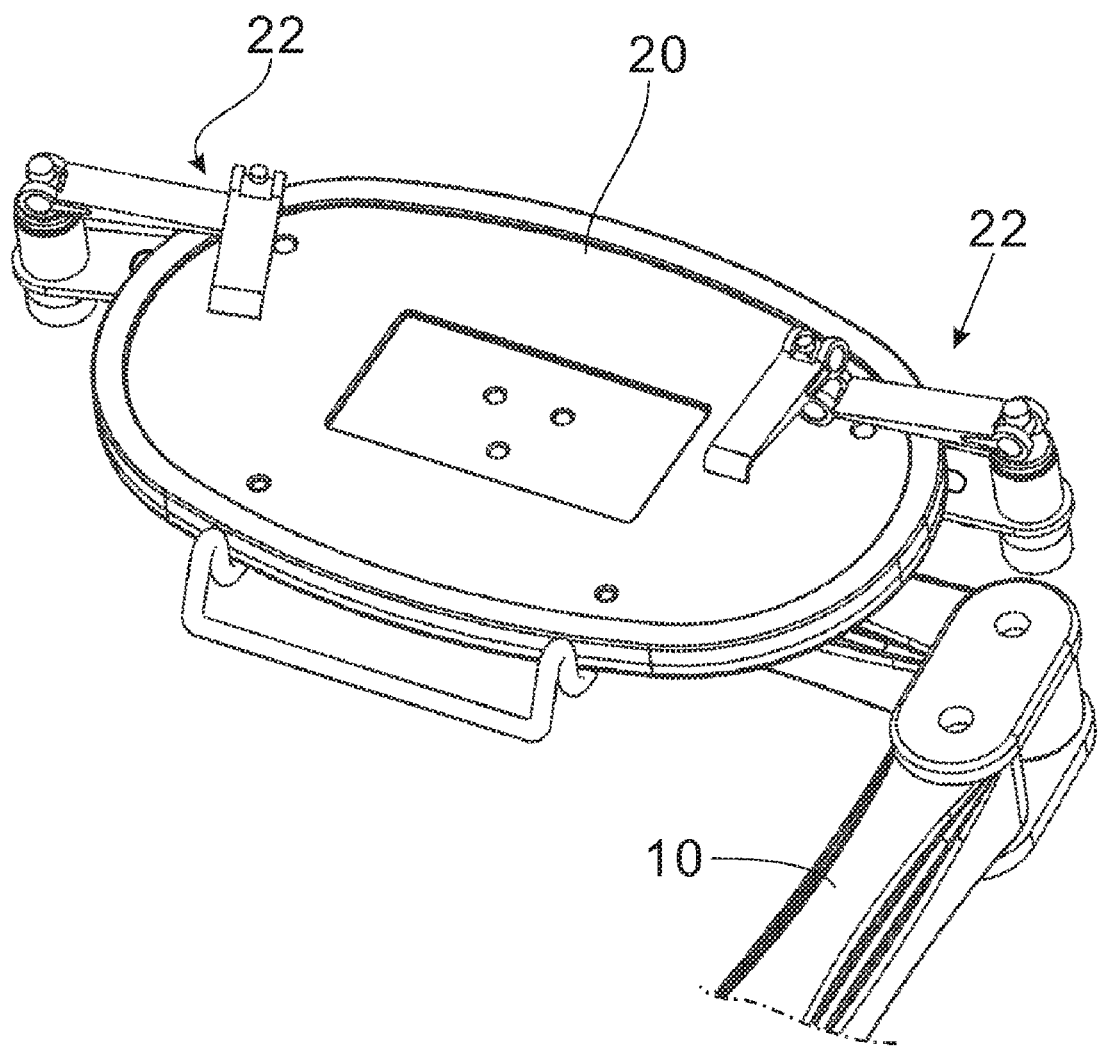
FIG. 1 is a perspective view of a preferred embodiment of support arm for a computer display according to the invention.
Figure 2:
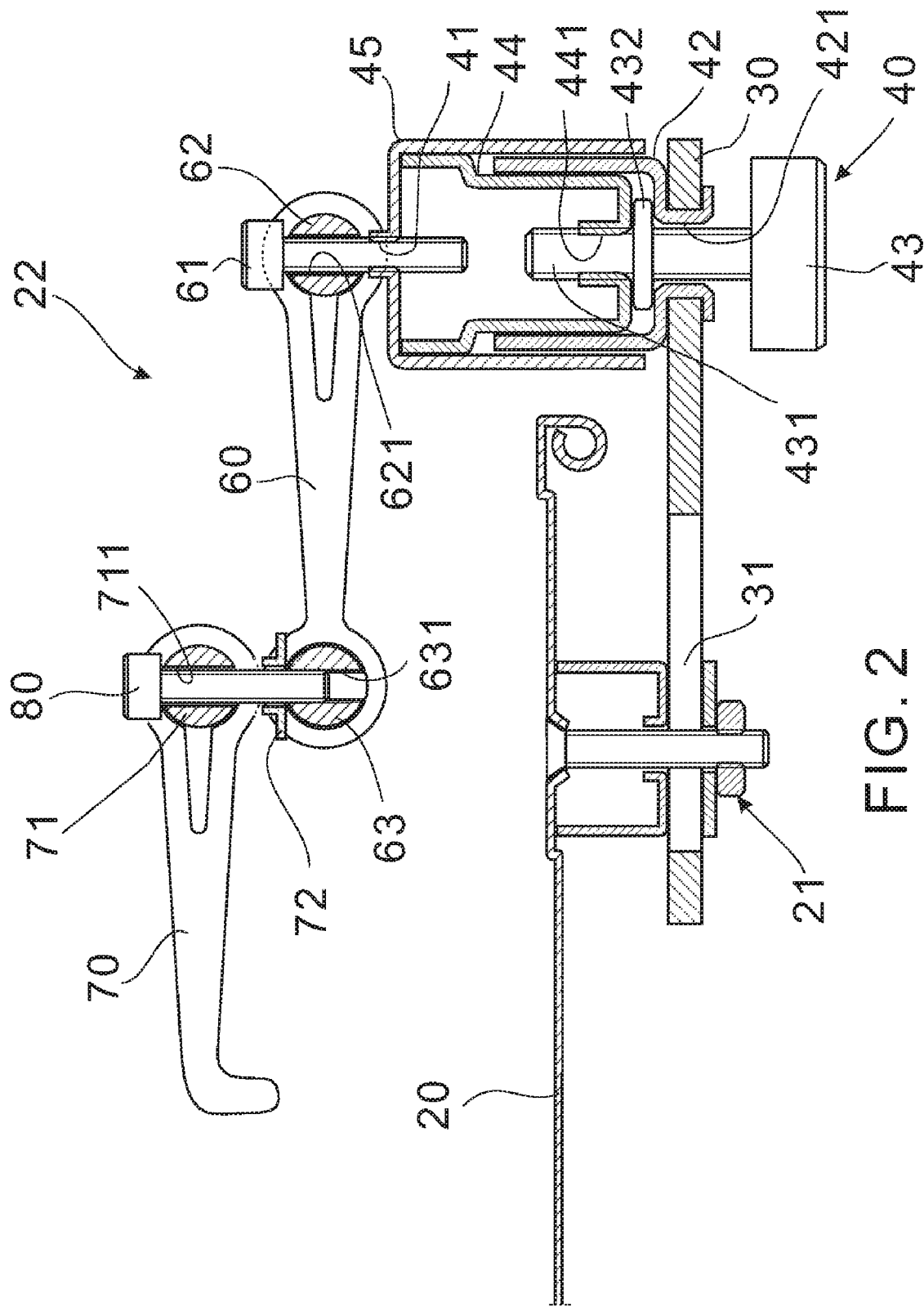
FIG. 2 is a longitudinal sectional view of the right side portion of FIG. 1.

Referring to FIGS. 1 to 6, a support arm for a computer display (e.g., LCD display) in accordance with a preferred embodiment of the invention is generally designated 10. The support arm 10 is provided with multiple pivotal joint. A support plate 20 is provided at an open end of the support arm 10. The oval support plate 20 comprises two opposite clamps 22 at both sides. The base 90 of an LCD display (not shown) is fastened on the support plate 20 by the clamps 22.

A support base 30 is provided and comprises a hole 31. A threaded fastener 21 is adapted to fasten the support base 30 under the support plate 20 by driving through the hole 31. A height adjustment mechanism 40 is provided at right side end of the support base 30 (see FIG. 2). The height adjustment mechanism 40 comprises an upper threaded hole 41. A pivotal first arm member 60 is provided on the top of the height adjustment mechanism 40 by fastening at the upper threaded hole 41. A first bolt 61 is driven through a longitudinal through hole 621 of a transverse pivot 62 at one end of the first arm member 60 into the upper threaded hole 41 for fastening.

A pivotal second arm member 70 comprises a transverse pivot 71 at the other end. A longitudinal through hole 711 is provided through the transverse pivot 71. A transverse pivot 63 is provided at one end of the first arm member 60. A longitudinal through hole 631 is provided through the transverse pivot 63. A washer 72 is squeezed between and by the longitudinal through hole 631 and the longitudinal through hole 711 which is aligned with the longitudinal through hole 631. A second bolt 80 is driven through the longitudinal through hole 711 and the washer 72 into the longitudinal through hole 631 for fastening.

The height adjustment mechanism 40 further comprises a cylindrical member 42 with both ends open. The cylindrical member 42 has a narrow opening 421 at a lower end. The height adjustment mechanism 40 further comprises a adjustment screw 43 having a threaded shank 431 inserted through the opening 421, an intermediate disk 432 squeezed between and by the bottom of the cylindrical member 42 and the bottom of a hollow first cylinder 44 with both ends open. The first cylinder 44 is partially mounted in the cylindrical member 42 and is adapted to vertically move with respect thereto. A hollow second cylinder 45 with both ends open is provided to substantially enclose most of the second cylinder 44 and the cylindrical member 42 in one operating position (see FIG. 2). The second cylinder 45 has a narrow top opening (not numbered) with the first bolt 61 driven through.

Figure 6:
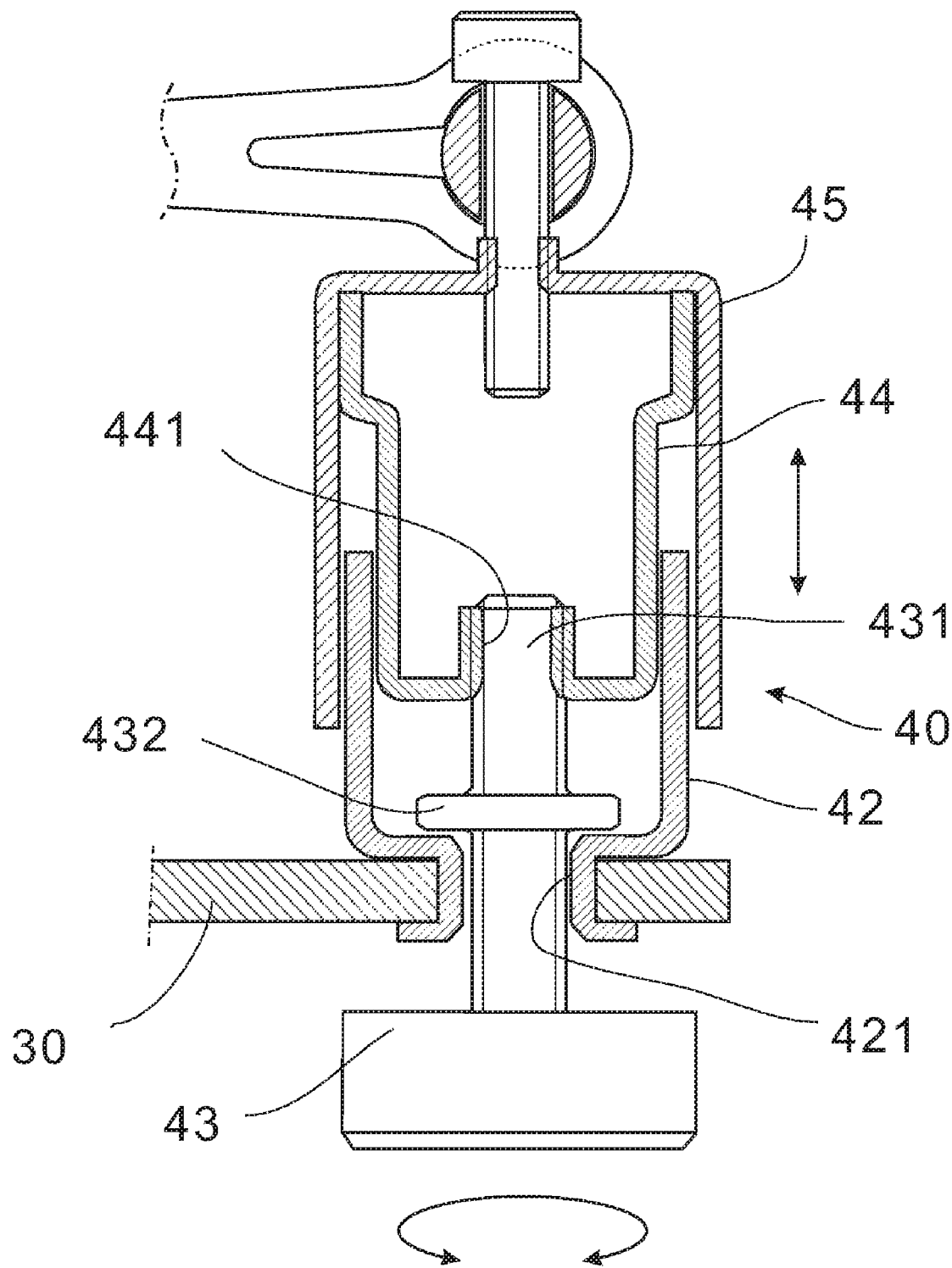
FIG. 6 is an enlarged view of the top central portion of FIG. 5 showing the vertical movement of the height adjustment mechanism after adjustment.

The first cylinder 44 comprises a threaded hole 441 on the bottom being threadedly secured to the threaded shank 431 such that turning the adjustment screw 43 in one direction (e.g., clockwise direction) will lift the second cylinder 44 or turning the adjustment screw 43 in the other opposite direction (e.g., counterclockwise direction) will lower the second cylinder 44 (see FIG. 6). As an end, the height of the clamp 20 can be adjusted for fitting different LCD displays with various base heights.

Figure 3:
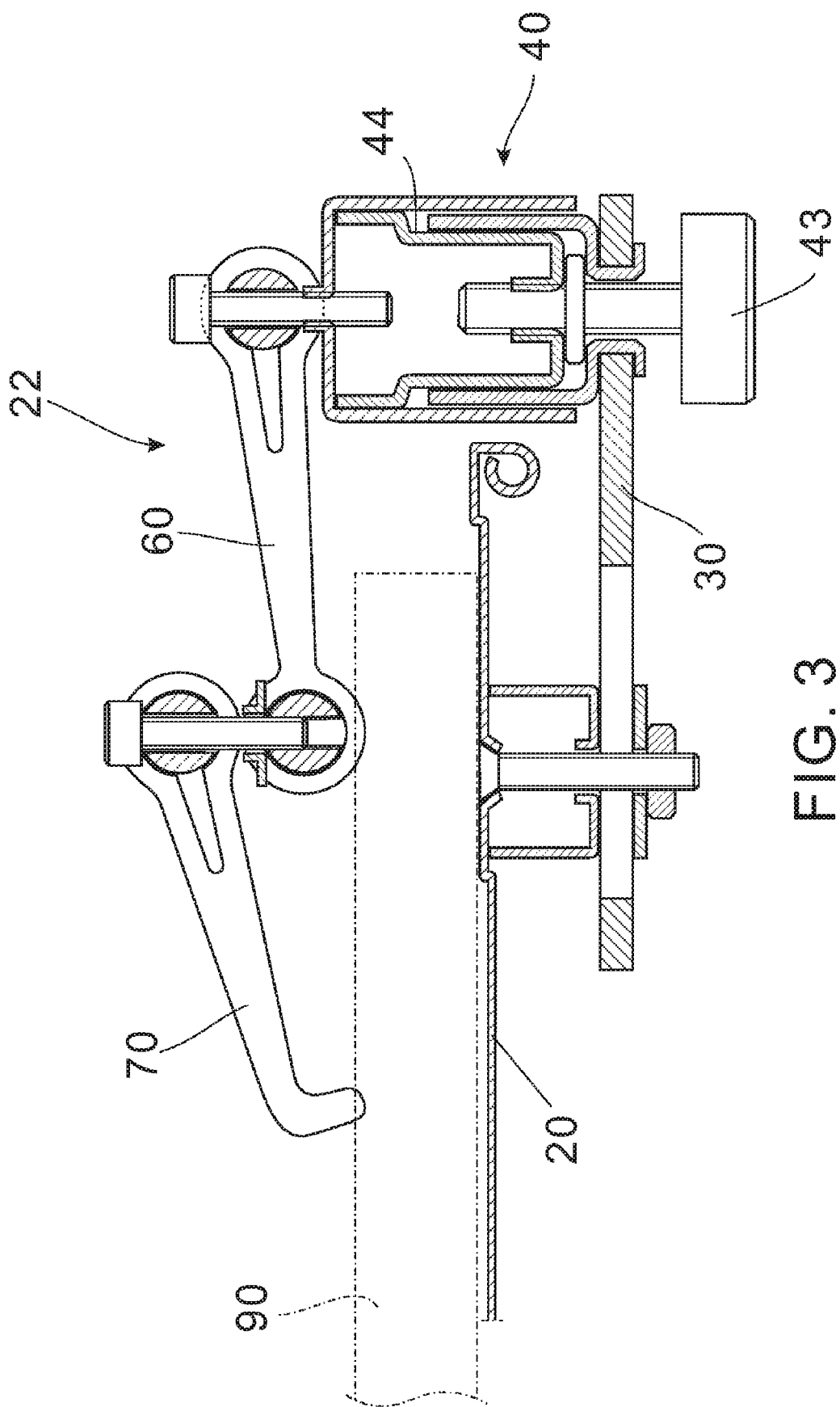
FIG. 3 is a view similar to FIG. 2 showing the base of an LCD display being clamped by the arm members.

As shown in FIG. 3 specifically, the base 90 of the LCD display is placed on the support plate 20. Next, pivotably press the second arm member 70 to urge against the top of the base 90 of the LCD display with one end of the first arm member 60 also urging against the top of the base 90 of the LCD display.

Figure 4:
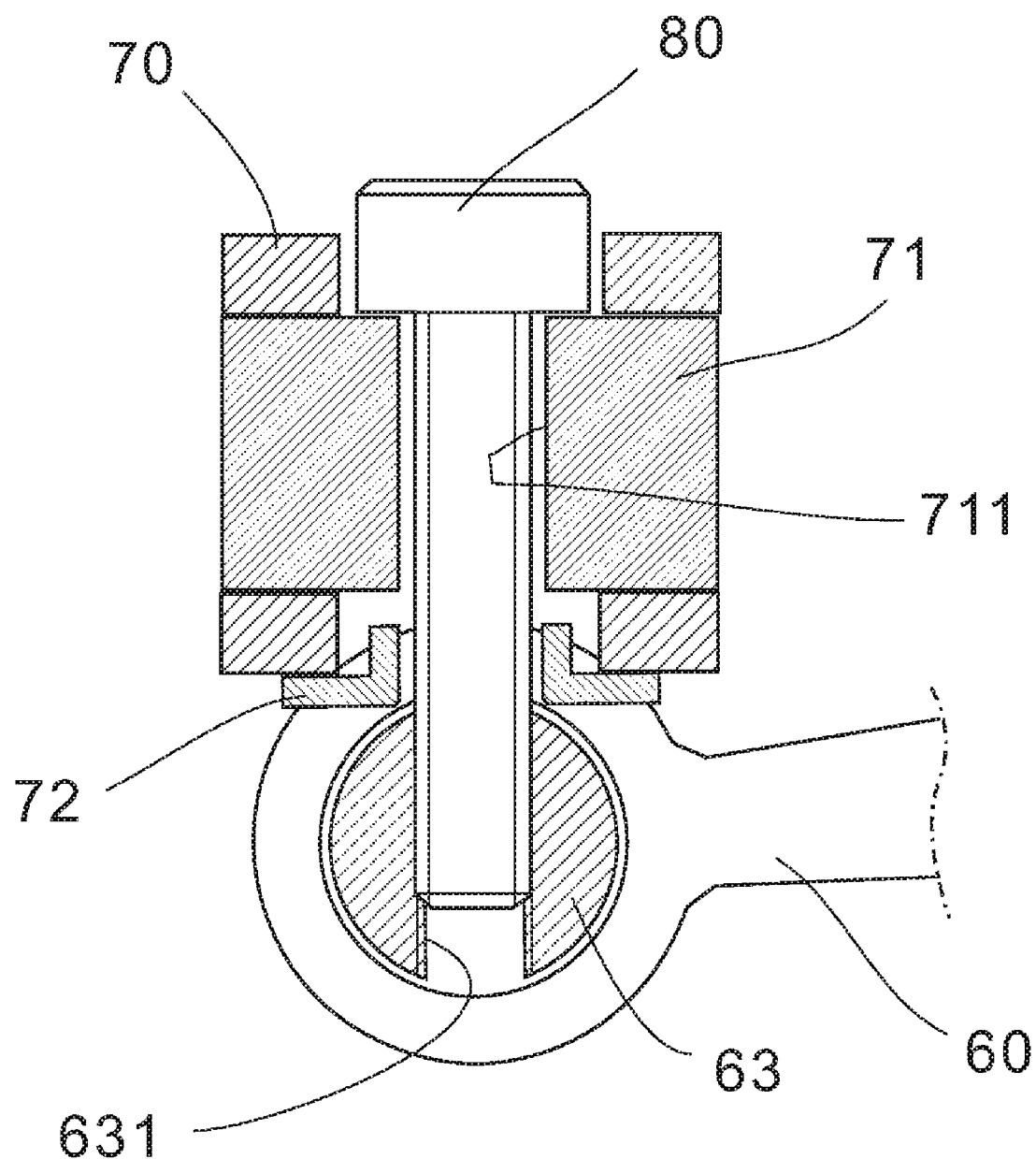
FIG. 4 is an enlarged view of the top central portion of FIG. 2 where the second arm member has been turned about 90 degrees.

As shown in FIG. 4 specifically, the second arm member 70 has been turned about 90 degrees from that shown in FIG. 3.

Figure 5:
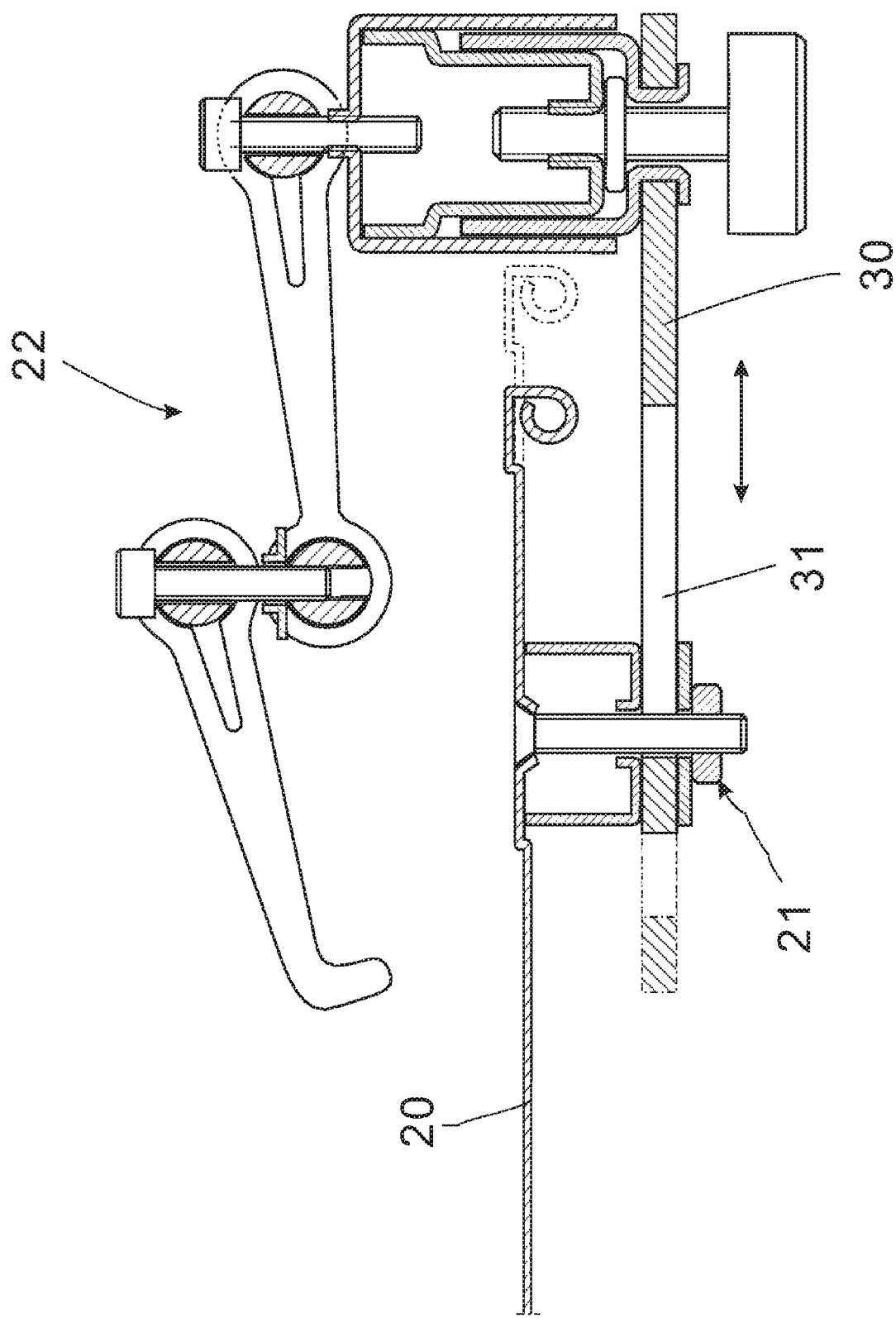
FIG. 5 is a view similar to FIG. 3 showing the lateral movement of the support plate.

As shown in FIG. 5 specifically, the fastener 21 is loosened at the hole 31 so as to permit the height adjustment mechanism 40 to move laterally until a desired position is reached. Next, fasten the fastener 21 again to fix the support plate 20.

As shown in FIG. 6 specifically, it is possible of turning the adjustment screw 43 in one direction (e.g., clockwise direction) to lift the second cylinder 44 or turning the adjustment screw 43 in the other opposite direction (e.g., counterclockwise direction) to lower the second cylinder 44. As an end, the purpose of adjusting the height of the clamp 20 to fit different LCD displays with various base (i.e., the base 90 of the LCD display) heights.

While the invention herein disclosed has been described by means of specific embodiments, numerous modifications and variations could be made thereto by those skilled in the art without departing from the scope and spirit of the invention set forth in the claims.

What is claimed is:

1. A support device comprising:
    a support arm (10);
    a support plate (20) mounted at an open end of the support arm (10) and adapted to support a visual display (90) thereon; and
    two opposite clamps (22) disposed at both sides of the support plate (20), each clamp (22) comprising:
    a support base (30);
    a threaded fastener (21) adapted to releasably fasten the support base (30) under the support plate (20);
    a height adjustment mechanism (40) mounted at an outer end of the support base (30);
    a first arm member (60) pivotably mounted on the top of the height adjustment mechanism (40); and
    a second arm member (70) pivotably mounted at a free end of the first arm member (60);
    whereby manipulating the fastener (21) will adjust a lateral position of the height adjustment mechanism (40), manipulating the height adjustment mechanism (40) will adjust a distance between the first arm member (60) and the support plate (20), and pivotably pressing the first and second arm members (60, 70) will secure the visual display (90) onto the support plate (20).

2. The support device of claim 1, wherein the height adjustment mechanism (40) comprises:
    a cylindrical member (42) having a lower opening (421) fastened at the outer end of the support base (30) and an open upper end;
    a first cylinder (44) having an open upper end and a threaded hole (441) on the bottom, the first cylinder (44) being partially disposed in the cylindrical member (42);
    a adjustment screw (43) including an intermediate disk (432) fixedly mounted on the bottom of the cylindrical member (42), a threaded shank (431) inserted through the lower opening (421) and the intermediate disk (432) to threadedly secure to the threaded hole (441); and
    a second cylinder (45) having an upper threaded hole (41) secured to the first arm member (60) and an open bottom, the second cylinder (45) being mounted on the first cylinder (44);
    whereby turning the adjustment screw (43) in a first direction will lift the second cylinder (44) or turning the adjustment screw (43) in a second opposite direction will lower the second cylinder (44).

* * * * *